United States Patent
Huang et al.

(10) Patent No.: US 9,983,622 B2
(45) Date of Patent: May 29, 2018

(54) METHOD OF APPLYING A TRANSFER FILM TO METAL SURFACES

(71) Applicant: HEWLETT-PACKARD DEVELOPMENT COMPANY, L.P., Houston, TX (US)

(72) Inventors: Chung-Hung Huang, Taipei (TW); Yu-Chuan Kang, Taipei (TW); Chien-Ting Lin, Taipei (TW); Kuan-Ting Wu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

(21) Appl. No.: 15/021,476

(22) PCT Filed: Oct. 31, 2013

(86) PCT No.: PCT/US2013/067734
§ 371 (c)(1),
(2) Date: Mar. 11, 2016

(87) PCT Pub. No.: WO2015/065420
PCT Pub. Date: May 7, 2015

(65) Prior Publication Data
US 2016/0231775 A1    Aug. 11, 2016

(51) Int. Cl.
| | |
|---|---|
| *G06F 1/16* | (2006.01) |
| *B32B 1/02* | (2006.01) |
| *C25D 11/02* | (2006.01) |
| *B32B 15/08* | (2006.01) |
| *C25D 11/04* | (2006.01) |

(Continued)

(52) U.S. Cl.
CPC .............. *G06F 1/1626* (2013.01); *B32B 1/02* (2013.01); *B32B 15/08* (2013.01); *C25D 11/024* (2013.01); *C25D 11/026* (2013.01); *C25D 11/04* (2013.01); *C25D 11/10* (2013.01); *C25D 11/26* (2013.01); *C25D 11/30* (2013.01); *B32B 2250/02* (2013.01); *B32B 2255/06* (2013.01); *B32B 2255/20* (2013.01); *B32B 2457/00* (2013.01);
(Continued)

(58) Field of Classification Search
None
See application file for complete search history.

(56) References Cited

U.S. PATENT DOCUMENTS

| | | |
|---|---|---|
| 7,989,079 B2 | 8/2011 | Lee et al. |
| 2007/0071992 A1 | 3/2007 | Okoroafor |

(Continued)

FOREIGN PATENT DOCUMENTS

| | | | |
|---|---|---|---|
| CN | 101521988 A | | 9/2009 |
| JP | 2010-259971 | * | 11/2010 |
| JP | 2013-067154 | * | 4/2013 |

OTHER PUBLICATIONS

Bohn; "HTC's Dark Materials: Hands-on Photos with the Grey One S, Black One X", <http://www.theverge.com/2012/2/28/2830567/htc-dark-materials-photos-gray-one-s-black-one-x>, Feb. 28, 2012

(Continued)

*Primary Examiner* — Kishnor Mayekar
(74) *Attorney, Agent, or Firm* — HPI Patent Department

(57) ABSTRACT

A method is provided for applying a transfer film to a metal surface. The method comprises electrochemically treating the metal to form an oxide layer, on to which a transfer film is applied.

4 Claims, 5 Drawing Sheets

(51) Int. Cl.
  *C25D 11/10* (2006.01)
  *C25D 11/26* (2006.01)
  *C25D 11/30* (2006.01)
  *H04M 1/02* (2006.01)
(52) U.S. Cl.
  CPC ... *G06F 2200/1633* (2013.01); *H04M 1/0283* (2013.01)

(56) References Cited

U.S. PATENT DOCUMENTS

| | | |
|---|---|---|
| 2009/0041988 A1 | 2/2009 | Ho et al. |
| 2009/0047505 A1 | 2/2009 | Liu et al. |
| 2009/0265915 A1 | 10/2009 | Lee et al. |
| 2009/0267266 A1 | 10/2009 | Lee et al. |
| 2009/0280347 A1 | 11/2009 | Yu |
| 2010/0112297 A1 | 5/2010 | Dai et al. |
| 2011/0262699 A1 | 10/2011 | Yializis et al. |
| 2011/0303547 A1 | 12/2011 | Ostrovsky |
| 2012/0052307 A1 | 3/2012 | Plieth et al. |
| 2012/0251706 A1* | 10/2012 | Huang .................. B05D 5/083 427/58 |
| 2012/0251839 A1* | 10/2012 | Zhang ..................... C25D 5/02 428/632 |
| 2013/0221816 A1 | 8/2013 | Liou et al. |

OTHER PUBLICATIONS

Rubino; "Rumor: Samsung Basing Next Windows Phone 8 Device Off of Galaxy S3 Design", <http://www.wpcentral.com/tags/focus-s >, Apr. 27, 2012.

\* cited by examiner

METHOD OF APPLYING A TRANSFER FILM TO METAL SURFACES

BACKGROUND

Devices such as mobile phones, tablets and portable (e.g. laptop or palm) computers are generally provided with a casing. The casing typically provides a number of functional features, e.g. protecting the device from damage.

Increasingly, consumers are also interested in the aesthetic properties of the casing such as the look, colour, and style. In addition, devices such as mobile phones, tablets and portable computers are typically designed for hand-held functionality, thus the consumer may also consider the weight of the device and the feel of the casing by which they hold the device.

BRIEF DESCRIPTION OF DRAWINGS

By way of non-limiting examples, device casings and processes of manufacturing such casings according to the present disclosure will be described with reference to the following drawings in which.

DETAILED DESCRIPTION

The present disclosure describes a method of applying a transfer film to a metal surface, for example the metal surface of a casing for a device. The method comprises the formation of a metal oxide layer on the metal surface through an electrochemical treatment of the metal surface. The electrochemical treatment disclosed allows for a high degree of control in determining various physical and visual properties of the metal oxide layer. Furthermore, the metal oxide layer formed by the disclosed method provides a good adherence of the oxide to the metal.

The metal oxide layer formed by the disclosed methods is porous in nature. This porosity can enhance the bonding between the electrochemically treated surface and the transfer film compared to oxide layers formed by other methods.

Depending on the conditions of the electrochemical treatment and the metal being treated, the disclosed method can be used and may vary to form metal oxide layers of 1-300 μm in thickness and more preferably 3-50 μm in thickness. In comparison, metal oxide layers formed by other techniques are typically in the range of 0.001-0.1 μm.

Figure 1:
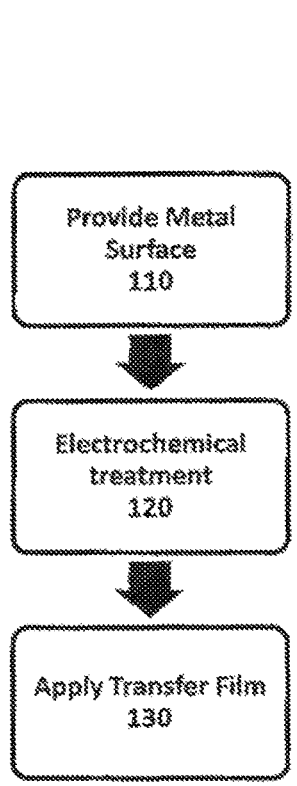
FIG. 1 is a flow diagram illustrating an example of a method of applying a transfer film to a metal surface
Figure 2:
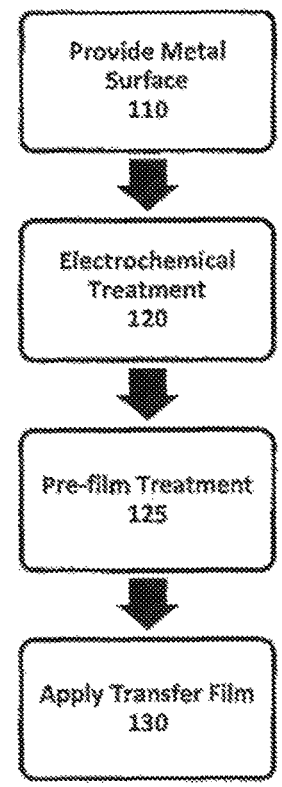
FIG. 2 is a flow diagram illustrating another example of a method of applying a transfer film to a metal surface

FIGS. 1 and 2 illustrate examples of methods of transfer film a metal surface.

Referring to FIG. 1, a metal surface (140) is provided (110). The metal surface may be, for example, in the form of a casing for a device. The casing can be formed using conventional methods, such as stamping or moulding, into the desired shape of the finished product. In one example, the casing is formed of a light metal, such as aluminium, magnesium, titanium or alloys thereof.

Figure 3:
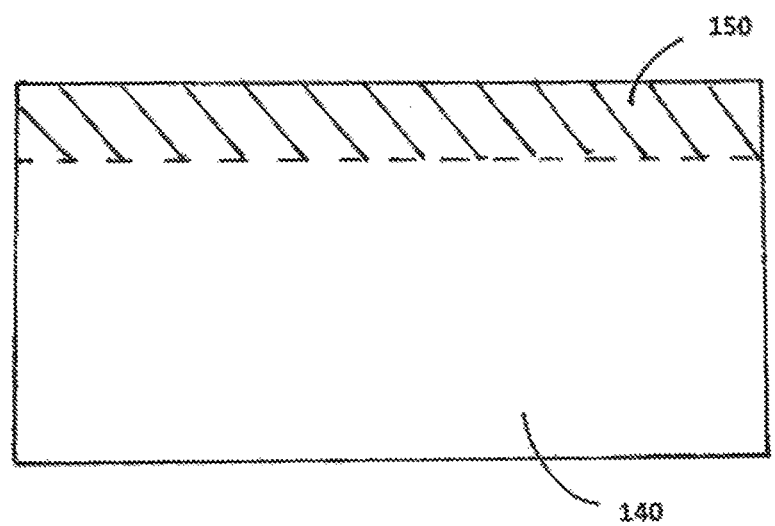
FIG. 3 is a sectional side view of an example of a metal oxide layer on a metal produced by the electrochemical treatment of FIG. 1 or FIG. 2

The metal surface (140) is electrochemically treated (120) to form a metal oxide layer (150) such as that shown in FIG. 3. The electrochemical treatment includes applying a potential greater than the oxide layer's dielectric breakdown potential to the metal surface in an electrolytic solution.

The dielectric breakdown potential of a material is the voltage applied via an electric field that the material can withstand without breaking down. When a material such as a metal oxide is treated with a potential greater than its dielectric breakdown potential, the breakdown results in a disruptive discharge through the metal oxide.

The dielectric breakdown potential of a material varies depending on a number of factors, for example the composition, thickness and temperature of the material.

An example of a suitable electrochemical process includes micro-arc oxidation (also known as plasma electrolytic oxidation). Micro-arc oxidation is an electrochemical surface treatment process for generating oxide layers on metal surfaces.

In one example of micro-arc oxidation, a metal is immersed in a bath of electrolytic solution, typically a dilute alkali solution such as potassium hydroxide. The casing is electrically connected so as to become one of the electrodes in the electrochemical cell, with the wall of the bath, typically formed of an inert material such as stainless steel, acting as the counter-electrode. A potential is applied between the two electrodes, which may be continuous or pulsing, and direct current or alternating current.

Figure 4:
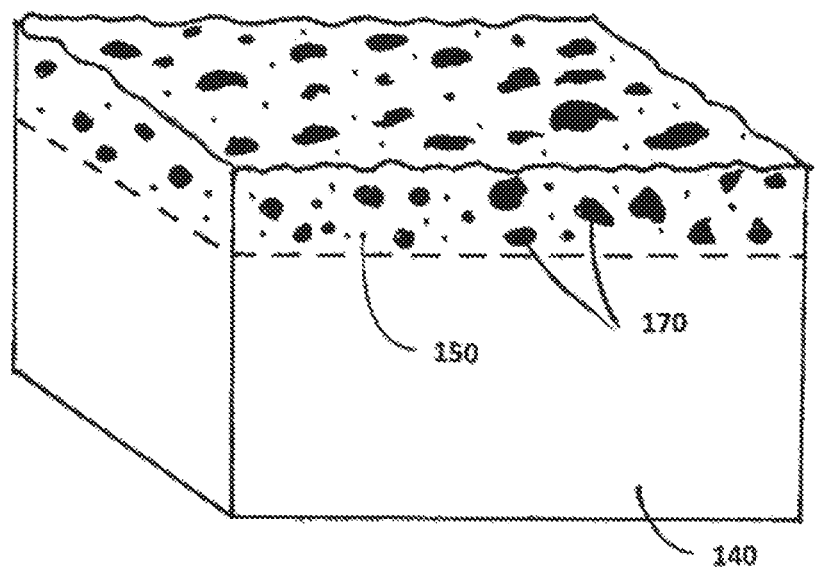
FIG. 4 is a perspective view of the metal oxide layer of FIG. 3

As potentials used in micro-arc oxidation are greater than the dielectric breakdown potential of the metal oxide layer, disruptive discharges occur and the resulting high temperature, high pressure plasma modifies the structure of the oxide layer. This results in an oxide layer that is porous (as shown in FIG. 4) and with the oxide in a substantially crystalline form.

In addition, oxide layers formed in the above manner are conversion coatings, converting the existing metal material into the oxide layer. This conversion of the metal provides a good adhesion of the oxide to the metal relative to oxide layers deposited on the metal as occurs using other methods.

Properties of the oxide layer such as porosity, hardness, colour, conductivity, wear resistance, toughness, corrosion resistance, thickness and adherence to the metal layer can be varied by varying the parameters of the electrochemical treatment. Such parameters include the electrolyte (e.g. temperature and composition), the potential (e.g. pulse or continuous, direct current or alternating current, frequency, duration and voltage) and the processing time.

In one example, the resulting colour of a titanium dioxide layer can be altered by varying the voltage applied. In another example, organic acid can be added to the electrolyte to allow for thicker oxide layers being formed.

Figure 5:
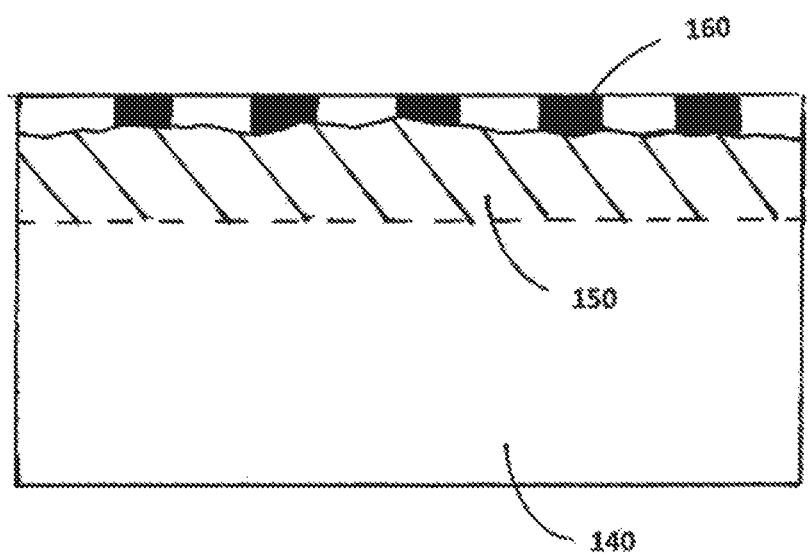
FIG. 5 is a sectional side view of an example of a coated metal surface produced by the method of FIG. 1 or FIG. 2

After electrochemically treating the metal surface (120), a transfer film (160) as shown in FIG. 5, for example a polymer based transfer film, can then be applied to the metal oxide layer (150). The porous nature of the metal oxide layer formed by the disclosed method can enhance the bonding between the transfer film and the metal oxide layer.

Examples of polymers that may be used in the transfer film include: polycarbonate (PC), polyethylene terephthalate (PET), glycol modified polyethylene terephthalate (PET-G), polyvinyl chloride (PVC), polyacrylic polymer such as polymethyl methacrylate (PMMA), polyphenylene sulphide (PPS) and UV ink. The polymer based transfer film may contain inorganic or metallic nano-particles.

Examples of processes that can be used to apply the polymer based transfer film include: in-mould decoration, out-side mould decoration, in-mould film, in-mould label, release film and nano-imprint lithography.

The selection of the polymer based transfer film and its application process may depend on desired properties of the film. These properties may include: visual, tactual and textural effects, as well as functional properties such as UV-protection, anti-fingerprinting or anti-bacterial capability.

Referring to FIG. 2, the oxide layer may undergo a pre-film treatment (125) prior to the application of the transfer film (130).

As with the polymer based transfer film, the pre-film treatment of the oxide layer (125) can be used to alter the visual, tactual and textural properties of the casing. Examples of pre-film treatments include: baking, dyeing, painting, spray coating, sputter coating, electrophoretic deposition, nano-coating, chemical vapour deposition and physical vapour deposition.

FIGS. 4 and 5 show examples of a metal surface as it undergoes a method as shown in FIG. 1. FIG. 4 shows the metal surface (140) having a metal oxide layer (150) formed by the electrochemical treatment of the metal surface (120). FIG. 5 shows a transfer film (160) on the metal oxide layer (150).

Figure 6:
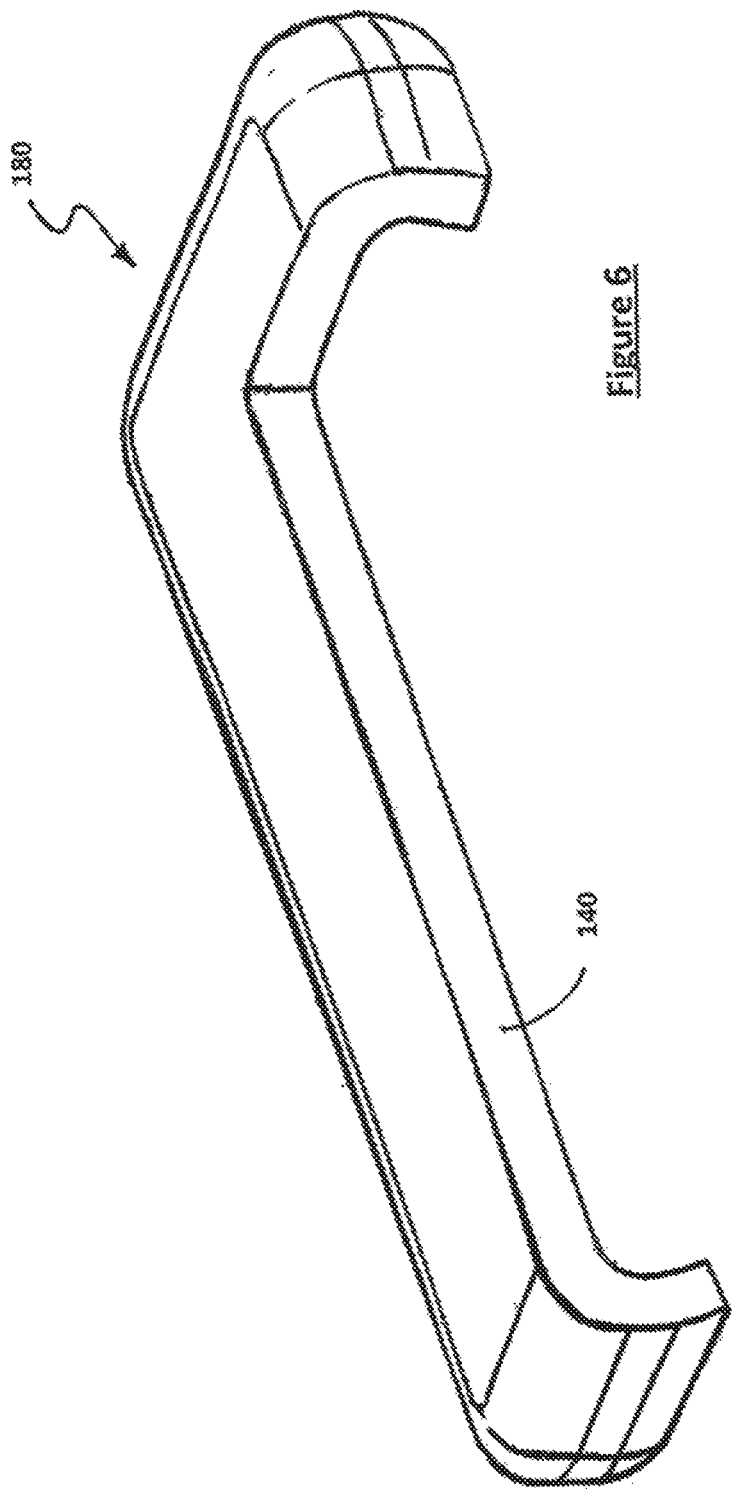
FIG. 6 is a perspective view of an example of a metal casing with a part of the casing cut away
Figure 7:
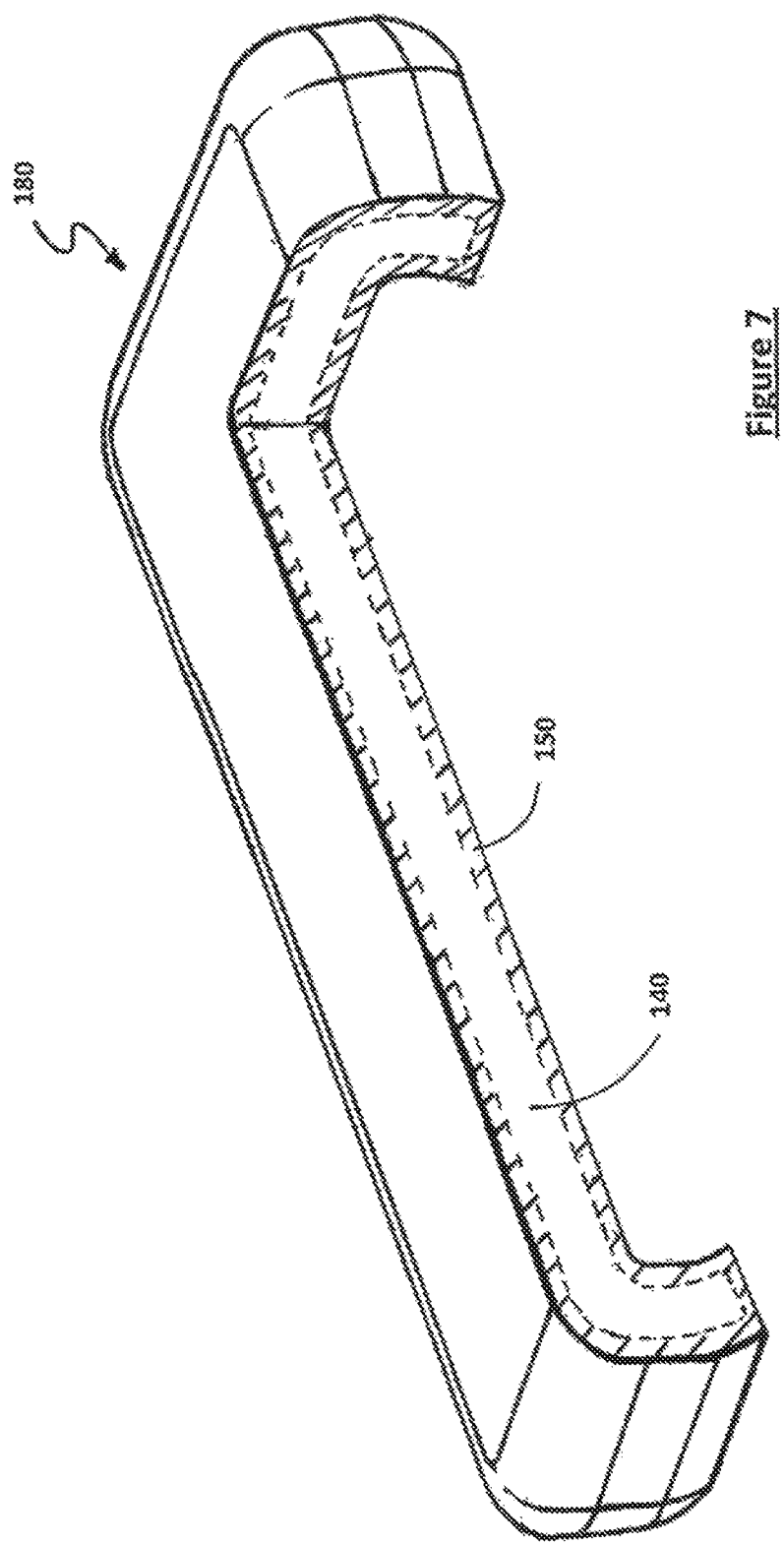
FIG. 7 is a perspective view of the casing of FIG. 6 after electrochemical treatment
Figure 8:
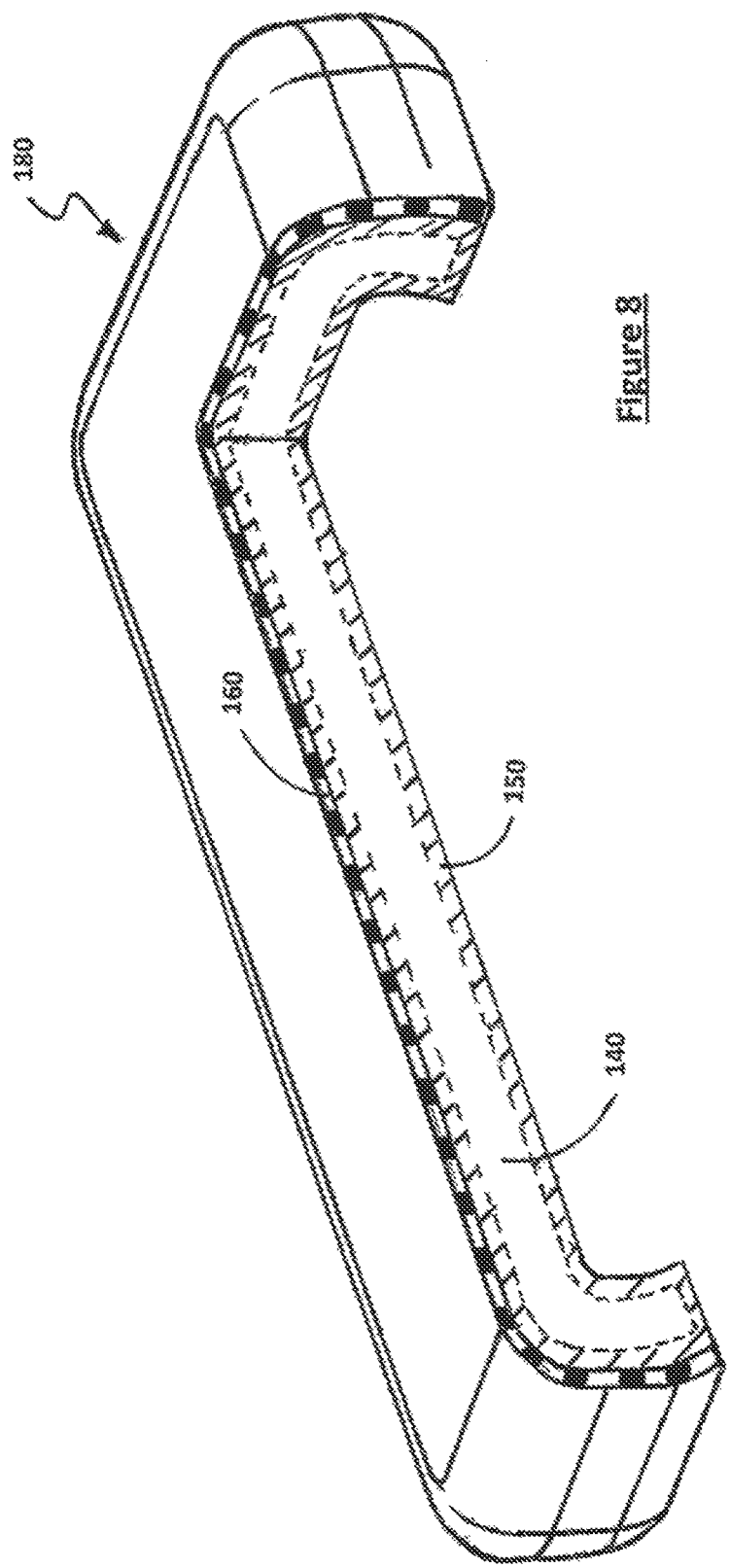
FIG. 8 is a perspective view of the casing of FIG. 7 after transfer film

FIGS. 6 to 8 provide an example of a casing (180) for a smart phone at various stages of the method of FIG. 1: FIG. 6 showing the casing having a metal surface (140); FIG. 7 showing the casing of FIG. 6 after electrochemical treatment (120); and FIG. 8 showing a transfer film (160) on the metal oxide layer (150) of the casing of FIG. 7.

It will be appreciated that numerous variations and/or modifications may be made to the above-described examples, without departing from the broad general scope of the present disclosure. The present examples are, therefore, to be considered in all respects as illustrative and not restrictive.

The invention claimed is:

1. A method of applying a polymer based transfer film to a metal surface, the method comprising:
   treating a titanium metal surface with micro-arc oxidation to form a porous titanium metal oxide layer at the titanium metal surface;
   altering a color of the porous titanium metal oxide layer by varying a voltage applied to the titanium metal surface during the micro-arc oxidation treatment;
   increasing a thickness of the porous titanium metal oxide layer by adding an organic acid to an electrolyte bath during the micro-arc oxidation treatment;
   selecting a material of the polymer based transfer film based on a visual property of the material;
   selecting an application process for the application of the polymer based transfer film based on the visual property; and
   applying the polymer based transfer film to the porous titanium metal oxide layer.

2. A method according to claim 1, wherein the porous titanium metal oxide layer undergoes a pre-film treatment prior to applying the transfer film to the porous titanium metal oxide layer.

3. A method according to claim 1, wherein the material of the polymer based transfer film is polyvinyl chloride (PVC).

4. A method according to claim 1, wherein the polymer based transfer film comprises one of inorganic nano-particles, metallic nano-particles or a combination thereof.

* * * * *

UNITED STATES PATENT AND TRADEMARK OFFICE
CERTIFICATE OF CORRECTION

PATENT NO. : 9,983,622 B2  
APPLICATION NO. : 15/021476  
DATED : May 29, 2018  
INVENTOR(S) : Chung-Hung Huang et al.

Page 1 of 1

It is certified that error appears in the above-identified patent and that said Letters Patent is hereby corrected as shown below:

On the Title Page

In Column 2, Primary Examiner, Line 1, delete "Kishnor Mayekar" and insert -- Kishor Mayekar --, therefor.

Signed and Sealed this
Twenty-fifth Day of September, 2018

Andrei Iancu
*Director of the United States Patent and Trademark Office*